United States Patent [19]

Iwakiri et al.

[11] Patent Number: 5,259,999
[45] Date of Patent: Nov. 9, 1993

[54] PROCESS FOR PRODUCING RESIN MOLDED ARTICLE HAVING DIMINISHED RESIDUAL STRESS

[75] Inventors: Tsuneaki Iwakiri; Toshiaki Izumida; Masanori Iwaki; Chikara Sadano, all of Kanagawa, Japan

[73] Assignee: Mitsubishi Gas Chemical Co., Inc., Tokyo, Japan

[21] Appl. No.: 818,116

[22] Filed: Jan. 8, 1992

Related U.S. Application Data

[63] Continuation-in-part of Ser. No. 679,851, Apr. 3, 1991, abandoned.

[30] Foreign Application Priority Data

Apr. 4, 1990 [JP] Japan .................................. 2-88179

[51] Int. Cl.$^5$ ........................ B29C 71/02; B29C 71/04
[52] U.S. Cl. ........................................ 264/1.4; 264/25; 264/235; 264/346
[58] Field of Search .................. 264/1.4, 22, 25, 26, 264/230, 235, 237, 345, 346; 425/174.4, 174

[56] References Cited

U.S. PATENT DOCUMENTS

| T909,018 | 4/1973 | Siclari et al. | |
|---|---|---|---|
| 3,555,135 | 1/1971 | Paul | 264/230 |
| 3,761,562 | 9/1973 | Skelham | 264/346 |
| 4,128,379 | 12/1978 | Hartitz et al. | |
| 4,339,303 | 7/1982 | Frisch et al. | 264/22 |
| 4,594,204 | 6/1986 | Heidenreich et al. | 425/174.4 |

FOREIGN PATENT DOCUMENTS

| 693109 | 8/1964 | Canada | 264/346 |
|---|---|---|---|
| 0145864 | 6/1985 | European Pat. Off. | |
| 2038794 | 2/1971 | Fed. Rep. of Germany | |
| 1629508 | 8/1971 | Fed. Rep. of Germany | |

OTHER PUBLICATIONS

Patent Abstracts of Japan, abstract of JP-A 61-032 419 Mitsubishi Electric Corp.

Primary Examiner—Jeffery Thurlow
Assistant Examiner—Mathieu Vargot
Attorney, Agent, or Firm—Sughrue, Mion, Zinn, Macpeak & Seas

[57] ABSTRACT

A process for producing a resin molded article having a diminished residual stress, which includes heating an injection-molded article of a thermoplastic resin by means of a combination of far infrared radiation with far infrared ray having a frequency of from $10^{11}$ to $10^{14}$ Hz and hot-air flow, thereby to diminish a residual stress in the molded article in a short period of time.

5 Claims, 1 Drawing Sheet

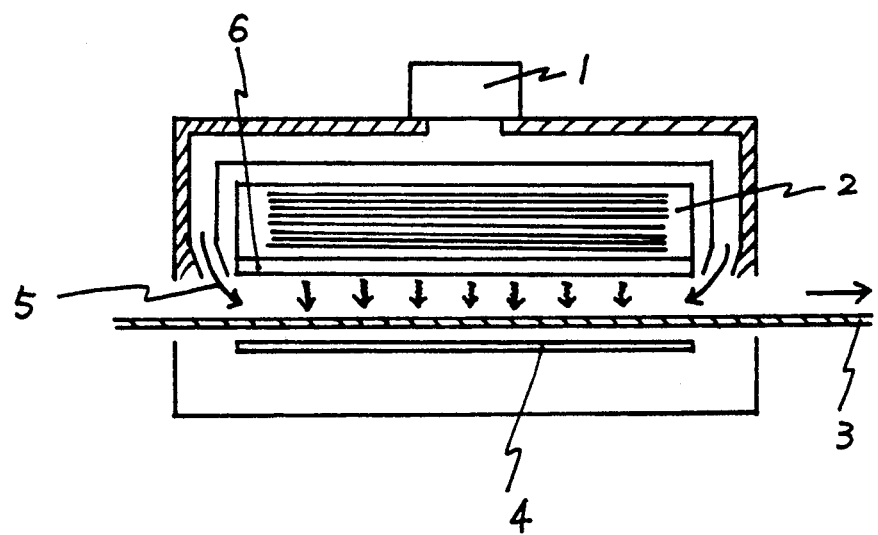

PROCESS FOR PRODUCING RESIN MOLDED ARTICLE HAVING DIMINISHED RESIDUAL STRESS

CROSS REFERENCE TO THE RELATED APPLICATION

This application is a continuation-in-part application of U.S. patent application Ser. No. 07/679,851, filed Apr. 3, 1991, entitled "PROCESS FOR PRODUCING RESIN MOLDED ARTICLE HAVING DIMINISHED RESIDUAL STRESS", now abandoned.

FIELD OF THE INVENTION

The present invention relates to a process for producing a resin molded article. More particularly, it relates to a process for producing a molded article having a diminished residual stress, in which a thermoplastic resin molded article is heated by means of a combination of far infrared radiation and hot-air flow to diminish the residual stress of the molded article. Compared with conventional hot-air flow treatment, the process of the present invention can reduce residual stress (residual strain) in a shorter period of time and is extremely effective in reduction of production cost, etc.

BACKGROUND OF THE INVENTION

In the production of automotive lamp lenses, particularly head lamp lenses, acrylic resins such as polymethyl methacrylate (PMMA), and acrylic-styrene resins (AS) have conventionally been used. In recent years, however, polycarbonate resins having high mechanical strength and heat resistance have come to cause attention and are practically used for the above use.

However, polycarbonate resins alone have problems concerning weatherability and mar resistance. Although a secondary processing to form a coating having good weatherability and mar resistance is mainly conducted to overcome those problems, this coating treatment necessitates a residual stress-reducing step, in which molded articles to be coated are heated with hot-air flow to remove molding strain in order to prevent blushing and cracking during the formation of the coating and also to prevent cracking due to long-term fatigue, and a cleaning and drying step for imparting good adhesion and appearance to the coating. In the residual stress-reducing step of those steps, a hot-air circulating drying oven is used for hot-air flow, but use of the hot-air circulating drying oven has been disadvantageous in that residual stress reduction takes much time, resulting in increased production cost, limited treating capacity, etc.

SUMMARY OF THE INVENTION

An object of the present invention is to provide a process for diminishing the residual stress (residual strain) of a thermoplastic resin molded article in a short period of time, which process can, therefore, increase the production efficiency of thermoplastic resin molded articles having a diminished residual stress and produce such molded articles at a low production cost.

Another object of the present invention is to provide a process for effectively diminishing the residual stress of a molded article having a large thickness.

Still another object of the present invention is to provide a process for effectively diminishing the residual stress of a molded article obtained from a thermoplastic resin which tends to have a residual strain through injection molding.

A further object of the present invention is to provide a process for effectively diminishing the residual stress of a thermoplastic resin molded article for use as an automotive lamp lens.

The process for producing a resin molded article having a diminished residual stress in accordance with the present invention comprises heating a molded article of a thermoplastic resin by means of a combination of heating with far infrared radiation having a frequency of from $10^{11}$ to $10^{14}$ Hz and hot-air flow, thereby to diminish a residual stress in the molded article in a short period of time.

BRIEF DESCRIPTION OF THE DRAWING

The drawing is to show one example of the far infrared radiation and hot-air flow heating apparatus used in the process of the present invention.

DETAILED DESCRIPTION OF THE INVENTION

In accordance with the present invention, the "heating with hot-air flow" means that the resin molded article is heated by positive contact with a flow of hot-air, i.e., it is not heated with static hot-air.

The molded article to be treated in the present invention is not particularly limited as long as it is made of a thermoplastic resin, and a thermoplastic resin alone, a resin composition obtained by blending two or more thermoplastic resins, and a composition obtained by incorporating a filler, a reinforcement, etc., into such a resin or resin composition can be used. The shape of the molded article is not particularly limited, but the process of the present invention is advantageously applicable to a molded article having a large thickness which requires much time to remove a residual strain by the conventional technique.

Examples of the thermoplastic resin include poly(vinyl chloride); acrylic resins such as polymethyl methacrylate (PMMA); polystyrene resins such as polystyrene (PS) and high impact polystyrene (HIPS); copolymers of polystyrene and an acrylic ester, acrylonitrile, or the like, such as acrylonitrile-butadiene-styrene resin (ABS), acrylonitrile-acrylic-styrene resin (AAS), methyl methacrylate-acryl acrylate-styrene copolymers (MAS), co-polymers of MAS and butadiene (MEBS), or the like; polyolefins such as polypropylene (PP), polyethylene (PE), polymethylpentene (TPX) or the like; homo- or co-polyacetal resins; crystalline or non-crystalline polyamide resins such as Nylon 6, Nylon 66, Nylon 610, Nylon 12, Nylon MXD6, or the like; crystalline, non-crystalline or liquid crystal polyester resins such as polybutylene terephthalate (PBT), polyethylene terephthalate (PET), copolymers of 1,4-cyclohexane dimethanol, ethylene glycol and terephthalic acid (PCTG), copolymers of PCTG, isophthalic acid and terephthalic acid (PCTA), Vectra (a tradename, all aromatic-type thermoplastic polyester manufactured by Hoechst-Celanese), or the like; engineering plastics such as aromatic polycarbonates (PC), poly(phenylene ether)s (PPE), poly(phenylene sulfide)s; (PPS), polysulfones, and polyetheretherketones (PEEK); and the like. Those resins can be used alone or as a resin composition prepared by blending two or more thereof. Further, those resins can also be advantageously used in the form of a composition prepared by blending therewith a thermoplastic elastomer or core-shell type elastomer, as an impact modifier, selected from various kinds of elastomers or a composition prepared by blending therewith a filler or reinforcement in the form of fibers, powder, spheres, scales, plates, tetrapods, or whiskers, or in any of other various forms. Of those examples, resins to which the process of the present invention is advantageously applied include high molecular weight general-purpose resins which particularly tend to have residual strain through injection molding, general-purpose engineering plastics, engineering plastics, super-heat-resistant engineering plastics, and the like, and also include compositions obtained by blending a filler or reinforcement with other resins. Polycarbonate resins are preferred.

The production process of the present invention can, for example, be practiced in the manner such that a molded article is rapidly heated to a temperature around the annealing temperature thereof and then maintained in a far infrared heating apparatus equipped with both a far infrared radiator emitting far infrared rays having a frequency of from $10^{11}$ to $10^{14}$ Hz and a hot-air flow means. The heating temperature is preferably a temperature 10° to 50° C. lower than the low-load heat distortion temperature (measured according to ASTM D 648, load: 66 psi) of the thermoplastic resin constituting the molded article. For example, the annealing temperature for a polycarbonate resin molded article is in the range of about from 120° to 135° C.

In order to more efficiently practice the process of the present invention, the heating apparatus can be provided with far infrared radiators at the upper and lower parts of the apparatus, or on the left and right sides thereof, or at the front and rear parts thereof according to need, thereby attaining more uniform heating. In combination with the far infrared radiation, hot-air flow should be used in the present invention.

Therefore, in practicing the process of the present invention, a heating apparatus is used, which has also a mechanism generating a hot-air flow and capable of heating or heat-insulating (=superheating prevention, cooling) the molded article by contacting the hot-air flow and the molded article. Examples of the mechanism are a hot-air fan, and the like.

The drawing shows one example of a heating apparatus equipped with both a far infrared radiation and a hot-air flow generating means, in which 1 is a hot-air fan, 2 is a far infrared radiation having a ceramic plate 6, 3 is a conveyor, 4 is a reflector, and 5 is hot-air flow. The resin molded article is placed on the conveyor 3 and is passed through a heating zone. The reflector 4 has a function to reflect far infrared rays emitted from the far infrared radiator 2. A material of the reflector is not particularly limited so long as it reflects far infrared rays. The representative example of the reflector is a stainless steel plate. If necessary, a heater is additionally provided under the reflector.

Due to such heating, the surface temperature of a molded article, on the surface of which residual stress tends to concentrate, can be maintained and temperature differences among parts of a three-dimensional molded article can be minimized. If the hot-air flow is not used and an ambient temperature is low, the molded article surface is cooled, resulting in a decreased strain-removing effect, but this can be prevented by the combined use of the hot-air flow and the far infrared radiation, thereby attaining the effect of diminishing residual stress to a lower level in a shorter period of time. On the other hand, in the case of using the far infrared radiation alone, the resin molded article gradually absorbs heat and is superheated, and as a result, in some cases the temperature of the resin molded article exceeds the heating temperature. However, by using the hot-air flow in combination with the far infrared radiation, the surface temperature of the resin molded article does not rise higher than the hot-air temperature, and becomes uniform. As a result, the predetermined effect of the present invention can be attained.

Further, although there are cases where heating is retarded locally by adherent water or other factors, this can be relieved by the combined use of the hot-air flow and the far infrared radiation, thus enabling production of molded articles having residual stresses which have been diminished to a lower level in a short period of time, which period, although varying depending on the molded article shape and residual stress level, is at the most about one-second to one-fifth the conventional treating period. As a result, in the case of polycarbonate molded articles, for example, the residual strain can be removed in a period of about from 5 to 10 minutes. It is preferred in the present invention to conduct the above-described heat treatment before dust particles adhere to the molded article to be treated or the molded article absorbs moisture. For example, the treatment is conducted immediately after injection molding.

According to the present invention, residual stress can be removed within an extremely short period of time as compared with the conventional technique. Therefore, the present invention brings about a reduction in production cost, a greatly increased treating capacity, and other effects, and is hence of considerable industrial significance.

The present invention is explained below in more detail by reference to the following examples, which should not be construed to be limiting the scope of the invention.

EXAMPLE 1 AND COMPARATIVE EXAMPLE 1

Using a polycarbonate resin (trade name, Iupilon S-2000; manufactured by Mitsubishi Gas Chemical Company, Inc., Japan), a rectangular plate having a size of 3 mm × 100 mm × 150 mm and a large residual stress was prepared at a high injection pressure and a high holding pressure.

This rectangular plate was heated with a far infrared radiation and hot-air flow heating apparatus (equipped with a far infrared radiator and a hot-air fan) manufactured by JARD Co., Ltd., Japan, and residual stress removal with the lapse of time was examined.

The results obtained are shown in Table 1 below together with the results of a comparative treatment in which heating was conducted by means of far infrared radiation alone (Comparative Example 1).

In the above heat treatment, the temperature of the far infrared radiator was regulated at 135° C., while that of the hot-air flow heater in the case of combined use thereof was regulated at 120° C.

Residual stress ($kg/cm^2$) was determined by an organic solvent method (using a mixed solvent of carbon tetrachloride and n-butanol).

TABLE 1

| | (Residual Stress, $kg/cm^2$) | | | | | |
|---|---|---|---|---|---|---|
| | | Treating Time (min) | | | | |
| | Heating Means | 0 | 3 | 5 | 10 | 20 |
| Example 1 | Far infrared radiation + | 190 | 78 | 55 | 36 | 36 |

TABLE 1-continued

| | | (Residual Stress, kg/cm$^2$) | | | | |
|---|---|---|---|---|---|---|
| | | Treating Time (min) | | | | |
| | Heating Means | 0 | 3 | 5 | 10 | 20 |
| Comparative Example 1 | hot-air flow Far infrared radiation alone | 190 | 150 | 150 | 150 | 150 |

The results in Table 1 show that in the case where far infrared radiation and hot-air flow are used in combination, heat treatment for as short as 10 minutes can reduce the residual stress to 40 kg/cm$^2$ or less, which value causes no practical problem. It was ascertained that in the case of heating with far infrared radiation alone (Comparative Example 1), the temperature of the inner part of the molded article did not reach 120° C. and, as a result, removal of the residual stress was insufficient. It was also ascertained that in the case where hot-air flow is used in combination with far infrared radiation (Example 1), the surface temperature of the molded article rose first and the inner part was then gradually heated to the predetermined temperature.

COMPARATIVE EXAMPLE 2

The same procedures as in Example 1 were repeated except that a conventional circulating hot-air (hot-air flow) drying oven only was used.

The results obtained are shown in Table 2 below.

TABLE 2

| | (Residual Stress, kg/cm$^2$) | | | | | |
|---|---|---|---|---|---|---|
| | Treating Time (min) | | | | | |
| | 0 | 10 | 20 | 30 | 60 | 90 |
| Hot-air flow alone | 190 | 110 | 77 | 55 | 37 | 37 |

The results in Table 2 show that in the case of hot-air flow alone, heat treatment for about 60 minutes is required to reduce the residual stress to 40 kg/cm$^2$ or less, which value causes no practical problem. In the above treatment, the time required for heating the inner part of the molded article to 120° C. was about 30 minutes.

EXAMPLE 2 AND COMPARATIVE EXAMPLE 3

The same procedures as in Example 1, in which far infrared radiation and hot-air flow were used in combination, and the same procedures as in Comparative Example 2, in which hot-air flow alone was used, were repeated except that an injection-molded article in the form of an open rectangular box having a wall thickness of 2.5 mm, a width of 100 mm, a length of 200 mm, and a height of 75 mm was used as the molded article to be treated.

The results obtained ar shown in Table 3 below.

TABLE 3

| | | (Residual Stress, kg/cm$^2$) | | | | | | |
|---|---|---|---|---|---|---|---|---|
| | | Treating Time (min) | | | | | | |
| | Heating Means | 0 | 1 | 2 | 5 | 10 | 20 | 30 |
| Example 2 | Far infrared radiation + hot-air flow | 110 | 77 | 77 | 37 | 37 | — | — |
| Comparative Example 3 | Hot-air flow alone | 110 | 77 | 77 | 77 | 77 | 37 | 37 |

The results in Table 3 show that for reducing the residual stress to 40 kg/cm$^2$ or less, which value causes no practical problem, the heat treatment with a hot-air flow alone (Comparative Example 3) requires 20 minutes, whereas 5-minute treatment is sufficient in the case of the heat treatment employing both far infrared radiation and a hot-air flow (Example 2).

In the above treatments, the time required for heating the molded article surface to 120° C. which is effective in residual stress removal was about 15 minutes in the treatment with a hot-air flow alone (Comparative Example 3) and was 5 minutes in the treatment employing both far infrared radiation and a hot-air flow (Example 2).

While the invention has been described in detail and with reference to specific embodiments thereof, it will be apparent to one skilled in the art that various changes and modifications can be made therein without departing from the spirit and scope thereof.

What is claimed is:

1. A process for reducing residual stress in a resin molded article, which consists essentially of heating an injection-molded article of a thermoplastic resin by means of a combination of far infrared radiation with far infrared rays having a frequency of from $10^{11}$ to $10^{14}$ Hz and hot-air flow, thereby to diminish residual stress in the molded article in a short period of time, wherein the heating is conducted at a temperature 10° to 50° C. lower than the low-load heat distortion temperature of the thermoplastic resin.

2. A process as claimed in claim 1, wherein the heating of the molded article by means of a combination of far infrared radiation and hot-air flow is conducted immediately after molding.

3. A process as claimed in claim 1, wherein the molded article is an article for use as an automotive lamp lens.

4. A process as claimed in claim 1, wherein the thermoplastic resin is a polycarbonate resin.

5. A process as claimed in claim 4, wherein the heating is conducted at a temperature of 120° to 135° C.

* * * * *